United States Patent [19]
Yamamoto et al.

[11] Patent Number: 5,677,528
[45] Date of Patent: Oct. 14, 1997

[54] SOLID-STATE IMAGING APPARATUS WITH A COEFFICIENT MULTIPLYING CIRCUIT

[75] Inventors: Yasutoshi Yamamoto, Hirakata; Masayuki Yoneyama, Takatsuki; Shogo Sasaki, Moriguchi; Yukihiro Tanizoe, Neyagawa, all of Japan

[73] Assignee: Matsushita Electric Industrial Co., Ltd., Osaka, Japan

[21] Appl. No.: 662,134

[22] Filed: Jun. 12, 1996

[30] Foreign Application Priority Data

Jun. 12, 1995 [JP] Japan .................. 7-144612

[51] Int. Cl.$^6$ .................................. H01J 40/14
[52] U.S. Cl. ............ 250/208.1; 250/226; 348/273
[58] Field of Search .................. 250/208.1, 226; 348/272, 273, 279, 222, 234, 237

[56] References Cited

U.S. PATENT DOCUMENTS 5,541,648  7/1996  Udagawa et al. ............ 348/222
5,552,826  9/1996  Hieda et al. ................. 348/222

FOREIGN PATENT DOCUMENTS

| | | |
|---|---|---|
| 63-114487 | 5/1988 | Japan . |
| 64-20787 | 1/1989 | Japan . |
| 64-54990 | 3/1989 | Japan . |
| 6133319 | 5/1994 | Japan . |

*Primary Examiner*—Que Le
*Attorney, Agent, or Firm*—Beveridge, DeGrandi, Weilacher & Young LLP

[57] ABSTRACT

A solid-state imaging apparatus having color separation filters is provided which produces a signal with reduced chrominance and luminance moire and thereby improves resolution, and the spectral characteristics of the color filters for the solid-state imaging apparatus are so set that when the spectral characteristic of each color filter is multiplied by a prescribed coefficient, the sum of four or two horizontally adjacent pixels becomes approximately equal between two vertically adjacent lines. A coefficient multiplying circuit multiplies an output signal from each color filter by the prescribed coefficient, and signal processing is performed.

8 Claims, 6 Drawing Sheets

SOLID-STATE IMAGING APPARATUS WITH A COEFFICIENT MULTIPLYING CIRCUIT

BACKGROUND OF THE INVENTION

1. Field of the Invention

The present invention relates to a solid-state imaging apparatus used in a video camera and the like, and more particularly to a color filter and a signal processing circuit.

2. Description of the Related Art

In recent years, because of improved performance of solid-state imaging apparatus and their associated signal processing circuits, solid-state imaging apparatus have been finding widespread use in home video cameras, etc.

One example of prior art solid-state imaging apparatus is disclosed in Japanese Patent Unexamined Publication No. 6-133319. This prior art solid-state imaging apparatus, with its signal processing circuit, will be described below with reference to drawings. FIG. 1 is a diagram showing an arrangement of color filters in the prior art solid-state apparatus, and FIG. 2 is a diagram showing a two-dimensional view of spatial frequencies representing their sampling carriers. In FIGS. 1 and 2, Mg (magenta), Gr (green), Ye (yellow), and Cy (cyan) designate the respective color filters. In FIG. 1, Px represents pixel spacing in the horizontal direction, and Pv indicates line spacing in the vertical direction. The illustrated arrangement is repeated for each block, two pixels wide in the horizontal direction and four lines high in the vertical direction, over the solid-state imaging device.

In FIG. 2, the abscissa represents the horizontal spatial frequency and the ordinate the vertical spatial frequency. It is claimed that, with the above filter arrangement, the prior art solid-state imaging apparatus can produce an output image with reduced chrominance moire since the carrier components appear only at the vertical Nyquist frequencies $(0, \frac{1}{2}Pv)$ and $(\frac{1}{2}Px, \frac{1}{4}Pv)$.

However, the spectral characteristics of ordinary color filters are such that $Mg=r+b$, $Gr=g$, $Ye=r+g$, $Cy=b+g$, as shown in FIG. 3, where r, g, and b are primary color signals for an input of reference white, and hence, the moire component at the vertical Nyquist frequency $(0, \frac{1}{2}Pv)$ is $(Mg+Gr)-(Ye+Cy)=-g$. The above configuration therefore has had the problem that chrominance moire and luminance moire occur at the vertical Nyquist frequency.

[DESCRIPTION OF THE REFERENCE NUMERALS]

1. SOLID-STATE IMAGING DEVICE,
2. SIGNAL PROCESSING CIRCUIT,
3. LUMINANCE/CHROMINANCE SEPARATION CIRCUIT,
4. CHROMINANCE SIGNAL PROCESSING CIRCUIT,
5. COLOR TEMPERATURE DETECTION CIRCUIT,
6. LUMINANCE SIGNAL PROCESSING CIRCUIT,
7. HIGH-FREQUENCY EMPHASIS CIRCUIT,
8. ADDER CIRCUIT,
9. COEFFICIENT MULTIPLYING CIRCUIT,
10. COEFFICIENT SETTING CIRCUIT,
11. SELECTOR,
12. MULTIPLIER

DESCRIPTION OF THE PREFERRED EMBODIMENTS

One embodiment of the present invention will be described below with reference to the accompanying drawings.

Figure 1:
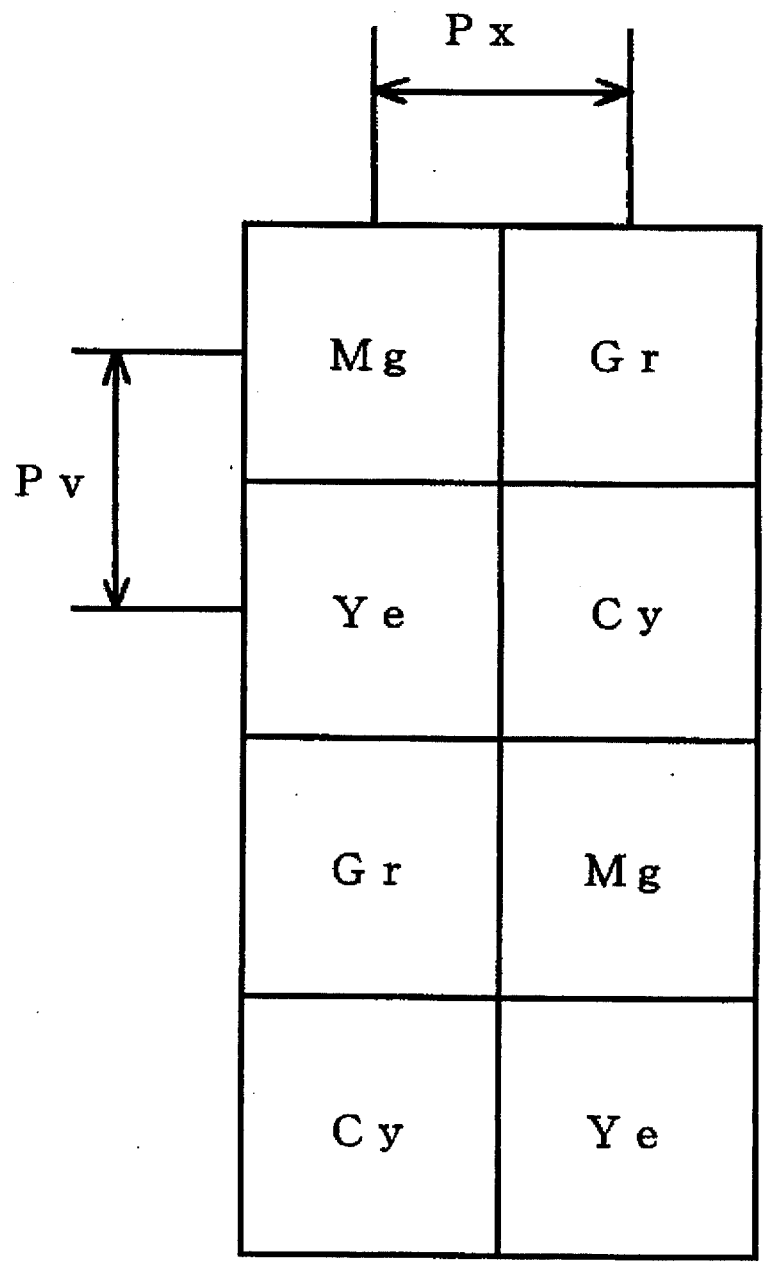
FIG. 1 is a diagram showing an arrangement of color filters in a prior art solid-state imaging apparatus and a solid-state imaging apparatus according to an embodiment of the present invention.
Figure 2:
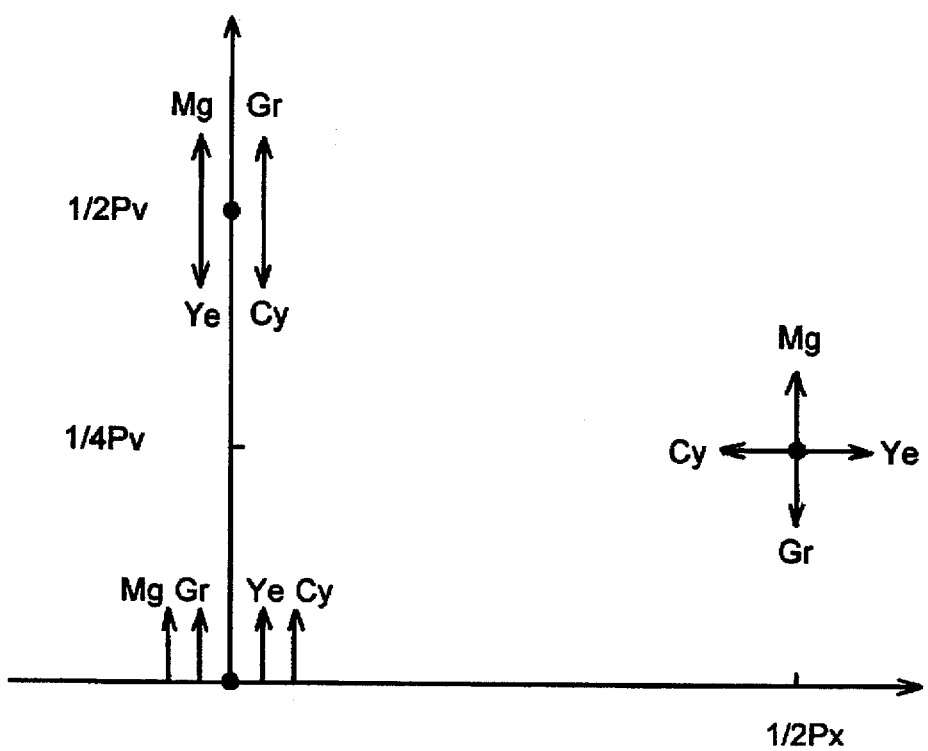
FIG. 2 is a diagram showing a two-dimensional view of spatial frequencies representing sampling carriers according to the prior art solid-state imaging apparatus and the solid-state imaging apparatus of the embodiment.

In this embodiment, the arrangement of color filters and a two-dimensional view of the spatial frequencies for the filters are the same as those shown in the description of the prior art. That is, FIG. 1 is a diagram showing an arrangement of color filters in the solid-state imaging apparatus of the embodiment, and FIG. 2 is a diagram showing a two-dimensional view of spatial frequencies representing their sampling carriers. In FIGS. 1 and 2, Mg (magenta), Gr (green), Ye (yellow), and Cy (cyan) designate the respective color filters. In FIG. 1, Px represents pixel spacing in the horizontal direction, and Pv indicates line spacing in the vertical direction. The illustrated arrangement is repeated for each block, two pixels wide in the horizontal direction and four lines high in the vertical directions, over the solid-state imaging device. In FIG. 2, the abscissa represents the horizontal spatial frequency and the ordinate the vertical spatial frequency.

Figure 3:
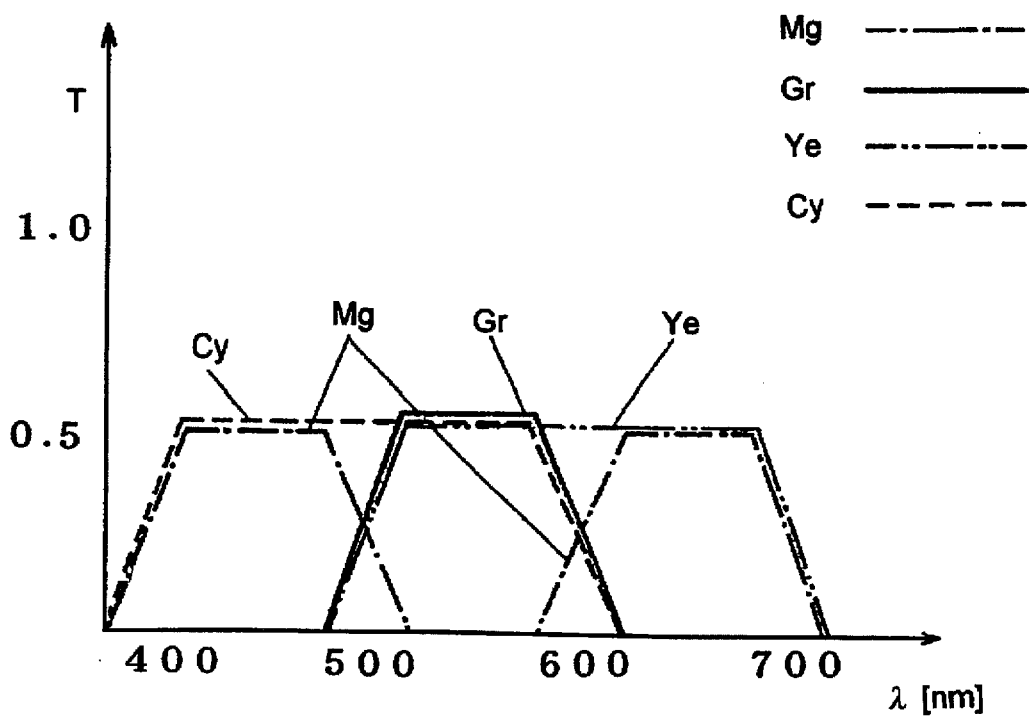
FIG. 3 is a diagram showing the spectral characteristics of the color filters in the prior art solid-state imaging apparatus.

When the spectral characteristics of the color filters are so set that $Mg=r+b$, $Gr=g$, $Ye=r+g$, and $Cy=b+g$, as shown in FIG. 3, where r, g, and b are the spectral characteristics of three primary colors for an input of reference white, it is common practice, in the case of a single-plate camera, to produce the luminance signal Y by summing Mg, Gr, Ye, and Cy in order to obtain high S/N ratio. In this case, the luminance signal Ya after gain adjustment is $2r+4g+2b$, which means that the ratio among the primary-color components is R:G:B=2:4:2. This ratio is largely different from the ratio among the primary-color components, for example, in the NTSC luminance signal, which is R:G:B= 0.30:0.59:0.11, and this large difference leads to degradation in final color reproduction.

Figure 4:
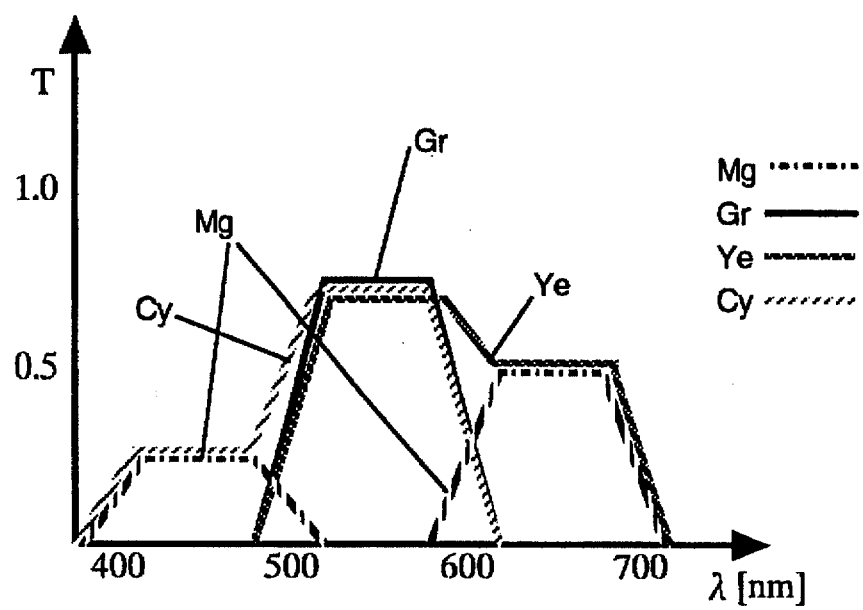
FIG. 4 is a diagram showing the spectral characteristics of the color filters in the solid-state imaging apparatus of the embodiment.

In the present embodiment, therefore, the spectral characteristics of the color filters are set as shown in FIG. 4. More specifically, the spectral characteristics of the color filters are set so that $Mg=r+0.5b$, $Gr=1.5g$, $Ye=r+1.5g$, and $Cy=0.5+1.5g$, where r, g, and b are the spectral characteristics of the three primary colors for an input of reference white.

Figure 6:
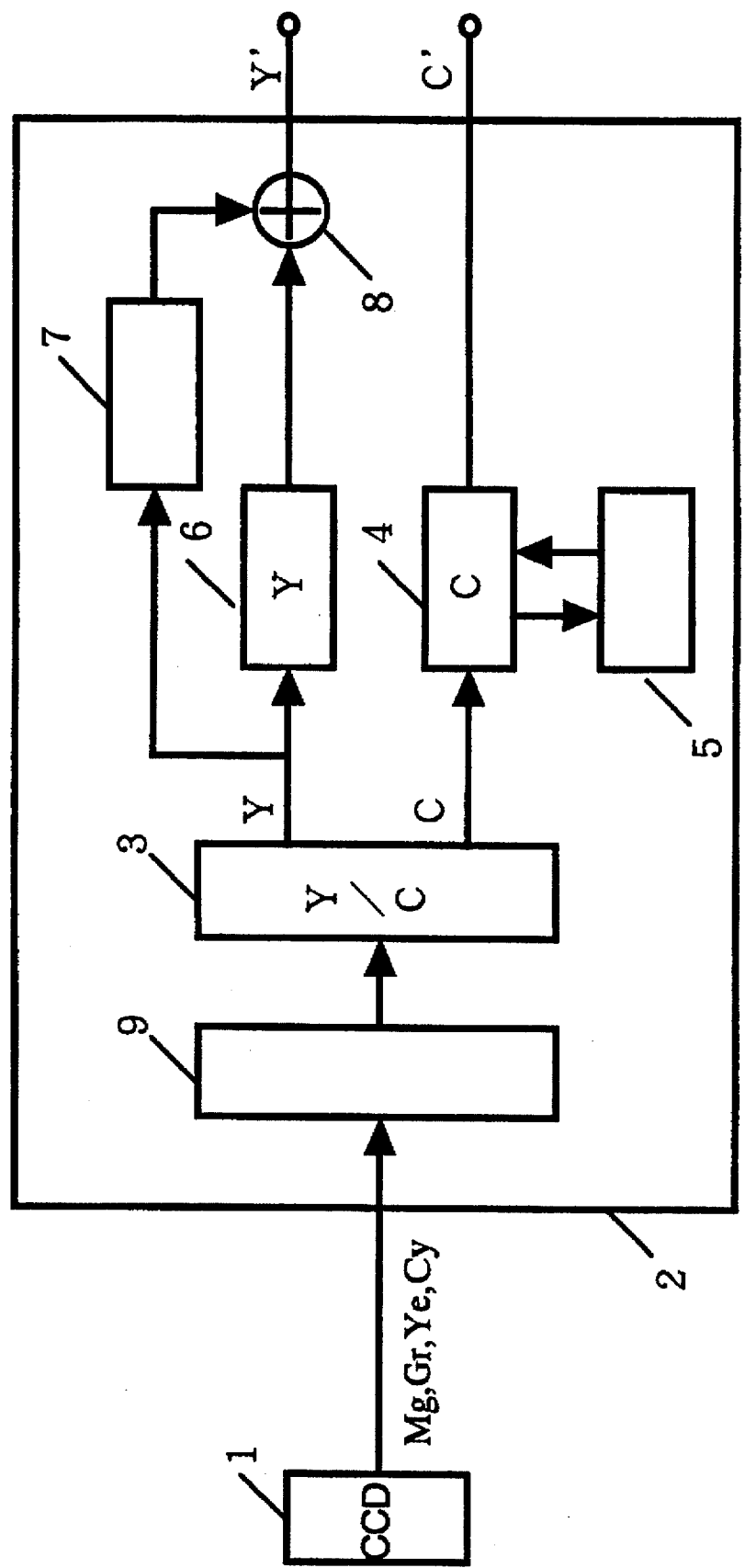
FIG. 6 is a diagram showing the configuration of the solid-state imaging apparatus of the embodiment.

FIG. 6 shows the configuration of the solid-state imaging apparatus of the present embodiment. In FIG. 6, reference numeral 1 is a solid-state imaging device, 2 is a signal processing circuit, 3 is a luminance/chrominance separation circuit, 4 is a chrominance signal processing circuit, 5 is a color temperature detection circuit, 6 is a luminance signal processing circuit, 7 is a high-frequency emphasis circuit, 8 is an adder circuit, and 9 is a coefficient multiplying circuit.

Output signals, Mg, Gr, Ye, and Cy, from the solid-state imaging device 1, are input into the coefficient multiplying circuit 9 in the signal processing circuit 2.

Figure 7:
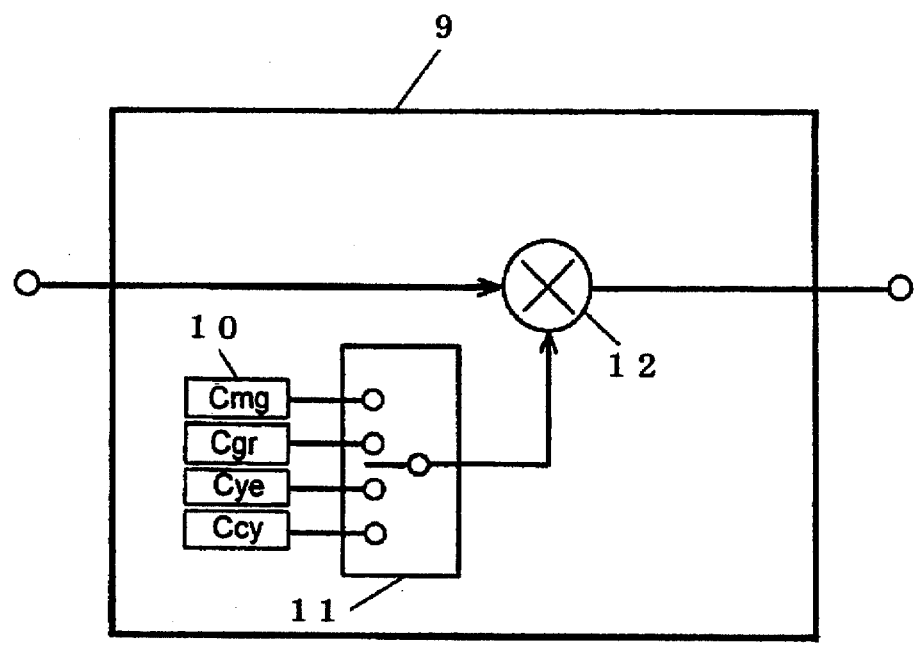
FIG. 7 is a diagram showing the configuration of a coefficient multiplying circuit 9 in the solid-state imaging apparatus of the embodiment.

FIG. 7 shows the configuration of the coefficient multiplying circuit 9. In FIG. 7, reference numeral 10 is a coefficient setting circuit, 11 is a selector, and 12 is a multiplier. The coefficient setting circuit 10 outputs coefficients, Cmg, Cgr, Cye, and Ccy, corresponding to the respective filter outputs. In the illustrated example, it is assumed that the coefficients are set so that (Cmg, Cgr, Cye, and Ccy)=(1, 2, 1, 1). The selector 11 selects the coefficient corresponding to each filter output of the solid-state imaging device 1 that is input to the coefficient multiplying circuit 9. The multiplier 12 multiplies each filter output by its corresponding coefficient, and outputs the resulting product.

The spectral characteristics of the color filter outputs, after passing through the coefficient multiplying circuit 9, are such that $Mg=r+0.5b$, $Gr=3g$, $Ye=r+1.5g$, and $Cy=0.5+1.5g$, where r, g, and b are the spectral characteristics of the three primary colors for an input of reference white.

Figure 5:
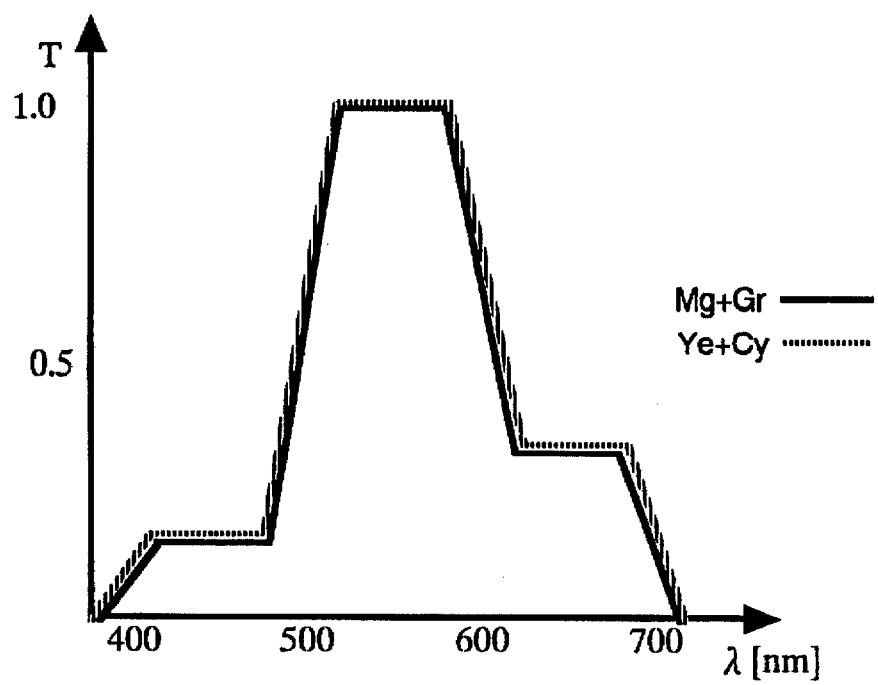
FIG. 5 is a diagram showing the spectral characteristics of Mg plus Gr and Ye plus Cy of the color filters in the embodiment.

In this case, Mg+Gr and Ye+Cy are as shown in FIG. 5, that is, $Mg+Gr=Ye+Cy=r+3g+0.5b$, hence, the moire component at the vertical Nyquist frequency (0, ½P) is $(Mg+Gr)-(Ye+Cy)=0$. This means that, by setting the spectral characteristics of the color filters as shown in FIG. 4, the luminance moire and chrominance moire at the vertical Nyquist frequency can be suppressed. In the present embodiment, since the spectral characteristics coincide, at the vertical Nyquist frequency the luminance moire and chrominance moire can be suppressed not only for an object of the reference white but for an object of any other color.

We will now describe how the coefficients Cmg, Cgr, Cye, and Ccy are determined. First, Cmg is set to 1. Next, red (R) in a color bar chart is recorded, and Cye is adjusted so that the output signal level of (Mg+Gr) coincides with the output signal level of (Ye+Cy). Since the color filters that affect the red (R) component are Mg and Ye, it follows that CmgMg+CgrGr=Cmg r=r=Cye Ye+Ccy Cy=Cye r, and when Cye is set to 1, for the red (R) component the output signal level of (Mg+Gr) coincides with the output signal level of (Ye+Cy). Next, blue (B) in a color bar chart is recorded, and Ccy is adjusted so that the output signal level of (Mg+Gr) coincides with the output signal level of (Ye+Cy). Since the color filters that affect the blue (B) component are Mg and Cy, it follows that CmgMg+CgrGr=Cmg 0.5 b=Cye Ye+Ccy Cy=Ccy 0.5 b, and when Ccy is set to 1, for the blue (B) component the output signal level of (Mg+Gr) coincides with the output signal level of (Ye+Cy). Finally, green (G) in a color bar chart is recorded, and Cgr is adjusted so that the output signal level of (Mg+Gr) coincides with the output signal level of (Ye+Cy). Here, CmgMg+CgrGr=Cmg 1.5g= Cye Ye+Ccy Cy=1.5g+1.5g=3g, and when Cgr is set to 2, for the green (G) component the output signal level of (Mg+Gr) coincides with the output signal level of (Ye+Cy). By determining the coefficients Cmg, Cgr, Cye, and Ccy in this way, moire can be suppressed for each primary color, and therefore, the luminance moire and chrominance moire can be suppressed for an object of any color.

In practice, however, the spectral characteristics cannot be made to coincide perfectly by adjusting these four coefficients, because of variations in the spectral characteristics of the color filters, but since moire for green (G) is suppressed by adjusting the coefficient Cgr for Gr which has the highest contribution to the luminance signal, the luminance moire can be minimized.

Furthermore, in cases where the spectral characteristics, r, g, and b, of the three primary colors, obtained for an input of reference white, can be expressed in terms of signal amount with reference to a given value s, the output signals of the respective filters are $Mg=1.5s$, $Gr=3s$, $Ye=2.5s$, and $Cy=2s$; although the signal amounts are different, the ratio among the primary-color components in the luminance signal Y becomes $R:G:B=1:3:0.5=0.2:0.6:0.1$, which is close to the ratio among the primary-color components in the NTSC luminance signal of $R:G:B=0.30:0.59:0.11$, thus improving the quality of final color reproduction.

With the above method of determining the coefficients, it may not be possible to fully suppress the luminance moire for an input of reference white, depending on the spectral characteristics of the color filters. However, by shooting an object where the waveform varies continuously, and by comparing the spectral characteristics and thereby selecting an appropriate combination of coefficient and spectral characteristic, the luminance moire can be minimized.

In the signal processing circuit 2, the output signals, Mg, Gr, Ye, and Cy, from the coefficient multiplying circuit 9, are input into the luminance/chrominance separation circuit 3 for separation into the luminance signal Y and chrominance signal C. The chrominance signal C is fed to the chrominance signal processing circuit 4, which performs prescribed signal processing, such as color temperature correction, gamma correction, and matrixing, on the chrominance signal C, and outputs a chrominance signal C'. The color temperature detection circuit 5 accepts the chrominance signal from the chrominance signal processing circuit 4, detects the color temperature of the light source, and supplies information for color temperature correction to the chrominance signal processing circuit 4.

The luminance signal Y output from the luminance/chrominance separation circuit 3 is fed to the high-frequency emphasis signal generating circuit 7 which outputs a high-frequency emphasis signal.

The luminance signal Y is also supplied to the luminance signal processing circuit 6 for signal processing such as gamma correction, and the resulting signal is summed with the high-frequency emphasis signal in the adder circuit 8 to produce an output signal Y'.

The spectral characteristics of the color filters are so set that, when the characteristic of each color filter is multiplied by a coefficient specific to the color filter, the sum of two horizontally adjacent pixels becomes approximately equal between two vertically adjacent lines, and in the signal processing circuit, the coefficient multiplying circuit performs the multiplication by the specific coefficient for the output signal of each color filter, and prescribed signal processing is performed. With this configuration, an image signal with luminance and chrominance moire suppressed can be obtained without degrading overall sensitivity.

In the present embodiment, the color filter array, which is higher than it is wide, is repeated for each block two pixels wide and four lines high, but it will be appreciated that the same effect can be obtained if the color pixel array is rotated 90 degrees and repeated for each block four pixels wide and two lines high. In the latter case, however, the vertical and horizontal directions of the spatial frequency for moire suppression are reversed from the spatial frequency shown in the present embodiment.

Further, in the present embodiment, the coefficient multiplying circuit 9 is constructed using a multiplier, but when the spectral characteristics of the color filters are adjusted as described in the present embodiment, since each coefficient is given as either 1 or 2, in the case of a digital signal the circuit can be implemented using a simple configuration such a bit shift.

Figure 8:
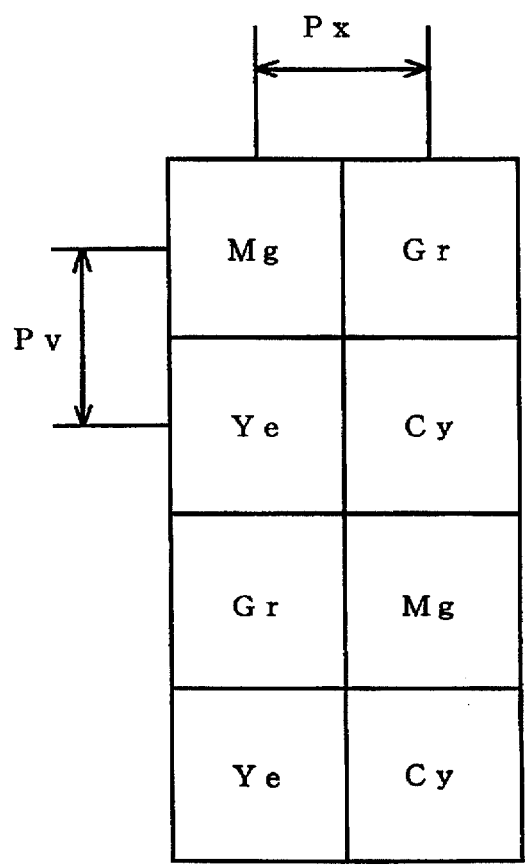
FIG. 8 is a diagram showing an arrangement of color filters in another embodiment of the present invention.
Figure 9:
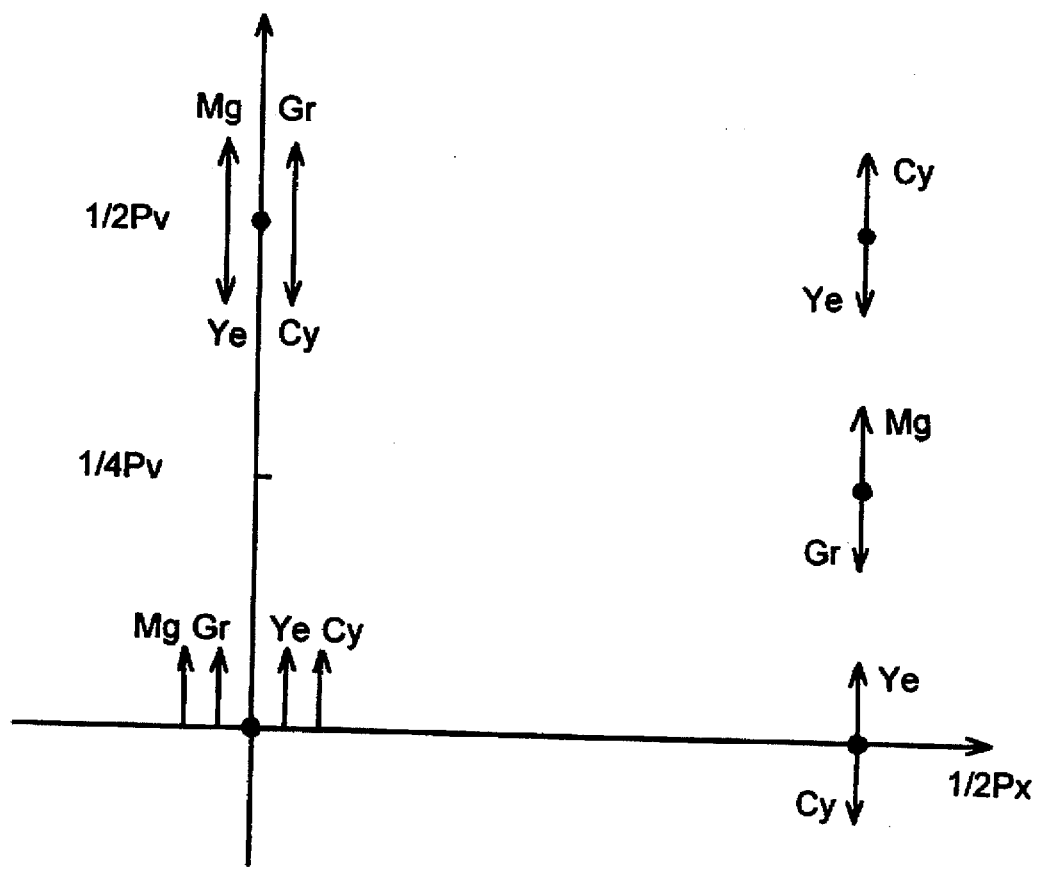
FIG. 9 is a diagram showing a two-dimensional view of spatial frequencies representing sampling carriers according to that other embodiment of the present invention.

Moreover, if the color filters are arranged as shown in FIG. 8, with their spatial frequencies as shown in the two-dimensional view in FIG. 9, at the vertical Nyquist frequency the luminance moire and chrominance moire can be suppressed not only for an object of the reference white but for an object of any other color, as in the present embodiment.

As is apparent from the above description, according to the present invention, the luminance moire and chrominance moire at the vertical Nyquist frequency can be suppressed without degrading overall sensitivity.

What is claimed is:

1. A solid-state imaging apparatus in which, of four color filters capable of separating colors, pairs of prescribed two color filters are arranged in a repeating fashion along a horizontal line of pixels of said solid-state imaging apparatus, and pairs of remaining two color filters are arranged in a repeating fashion along an adjacent horizontal line to said horizontal line, and in which a signal processing circuit is provided which has a coefficient multiplying circuit for multiplying output signals of said four color filters respectively by prescribed coefficients, wherein said coefficients by which to multiply said output signals are so set that, for an object of any color a sum of the signals output from said prescribed two color filters becomes approximately equal to a sum of the signals output from said remaining two color filters.

2. A solid-state imaging apparatus according to claim 1, wherein for an input of reference white, said four color filters output signals of different levels.

3. A solid-state imaging apparatus in which, of four color filters capable of separating colors, pairs of prescribed two color filters are arranged in a repeating fashion along a vertical line of pixels of said solid-state imaging apparatus, and pairs of remaining two color filters are arranged in a repeating fashion along an adjacent vertical line to said vertical line, and in which a signal processing circuit is provided which has a coefficient multiplying circuit for multiplying output signals of said four color filters respectively by prescribed coefficients, wherein said coefficients by which to multiply said output signals are so set that, for an object of any color, a sum of the signals output from said prescribed two color filters becomes approximately equal to a sum of the signals output from said remaining two color filters.

4. A solid-state imaging apparatus according to claim 3, wherein for an input of reference white, said four color filters output signals of different levels.

5. A solid-state imaging apparatus in which, of four color filters capable of separating colors, pairs of prescribed two color filters are arranged in a repeating fashion along a horizontal line of pixels of said solid-state imaging apparatus, and pairs of remaining two color filters are arranged in a repeating fashion along an adjacent horizontal line to said horizontal line, and in which a signal processing circuit is provided which has a coefficient multiplying circuit for multiplying output signals of said four color filters respectively by prescribed coefficients, wherein when said coefficients by which to multiply said output signals are specific values, spectral characteristics of said four color filters are so set that, for an object of any color, a sum of the signals output from said prescribed two color filters becomes approximately equal to a sum of the signals output from said remaining two color filters.

6. A solid-state imaging apparatus according to claim 5, wherein for an input of reference white, said four color filters output signals of different levels.

7. A solid-state imaging apparatus according to claim 5, wherein for an input of reference white, said four color filters output signals of different levels.

8. A solid-state imaging apparatus in which, of four color filters capable of separating colors, pairs of prescribed two color filters are arranged in a repeating fashion along a vertical line of pixels of said solid-state imaging apparatus, and pairs of remaining two color filters are arranged in a repeating fashion along an adjacent vertical line to said vertical line, and in which a signal processing circuit is provided which has a coefficient multiplying circuit for multiplying output signals of said four color filters respectively by prescribed coefficients, wherein when said coefficients by which to multiply said output signals are specific values, spectral characteristics of said four color filters are so set that, for an object of any color, a sum of the signals output from said prescribed two color filters becomes approximately equal to a sum of the signals output from said remaining two color filters.

* * * * *